United States Patent [19]

Bozzacco

[11] 4,407,233
[45] Oct. 4, 1983

[54] SAFETY COLLAR FOR PETS

[76] Inventor: Eleanor Bozzacco, 213 Baldwin St., Orange, N.J. 07050

[21] Appl. No.: 336,418

[22] Filed: Dec. 31, 1981

[51] Int. Cl.³ ............................................. A01K 27/00
[52] U.S. Cl. ...................................... 119/106; 350/98
[58] Field of Search ................. 119/106, 109; 350/98, 350/97, 103; 250/402

[56] References Cited

U.S. PATENT DOCUMENTS

| | | | |
|---|---|---|---|
| 206,749 | 1/1967 | Klimkiewicz | 116/300 |
| 206,861 | 2/1967 | Klimkiewicz | 99/321 |
| 243,411 | 2/1977 | Johnson | 211/51 |
| 2,342,005 | 2/1944 | Mittag | 250/462 |
| 2,567,233 | 9/1951 | Palmquist et al. | 350/105 |
| 2,807,984 | 10/1957 | Bailey | 350/98 |
| 3,765,376 | 10/1973 | Higgins | 119/106 |
| 3,871,336 | 3/1975 | Bergman | 119/106 |
| 3,994,560 | 11/1976 | Rice | 350/98 |
| 3,999,521 | 12/1976 | Puiello | 350/98 |
| 4,091,766 | 5/1978 | Colliard | 119/106 |
| 4,266,511 | 5/1981 | Muench | 119/106 |

FOREIGN PATENT DOCUMENTS

| | | | |
|---|---|---|---|
| 683400 | 11/1939 | Fed. Rep. of Germany | 350/98 |
| 189274 | 2/1937 | Switzerland | 350/98 |
| 265684 | 12/1949 | Switzerland | 350/98 |

*Primary Examiner*—Jay N. Eskovitz
*Attorney, Agent, or Firm*—Martha G. Pugh

[57] ABSTRACT

The invention relates to a safety collar or similar device for pets comprising one or more elongated attachments extended in a direction transverse to the length direction of the collar, which are of highly reflective material. The attachments are light in weight and of such a length, shape and reflectively that they are readily visible by reflected light on the neck of an animal whose hair tends to cover the collar or basic device. The attachments may be of any desired number, and are disclosed in numerous shapes and forms.

17 Claims, 11 Drawing Figures

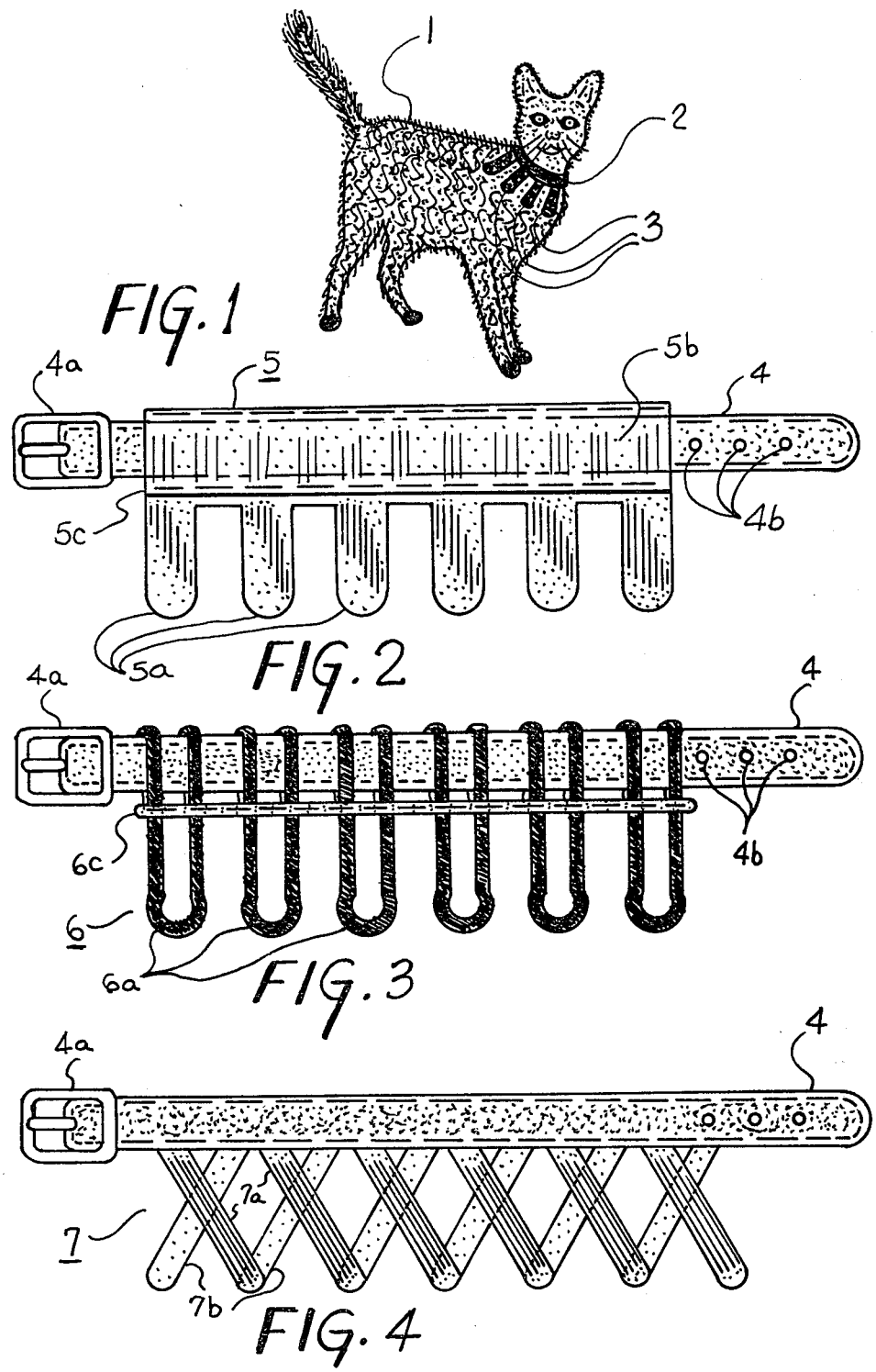

SAFETY COLLAR FOR PETS

BACKGROUND OF THE INVENTION

This invention relates in general to protective devices for animals, and more particularly to such devices as are constructed to be visible at night or in the dark.

It is well-known in the prior art to place collars on animals which have reflective strips or plates which have the ability to reflect light. Such collars are particularly useful at night to permit ease of location of the animal. A particular disadvantage of such a device is that the hair or fur of the animal tends to obscure the reflective strips or plates and to thereby substantially reduce the collar's total reflectivity.

SHORT DESCRIPTION OF THE INVENTION

It is therefore a principal object of the present invention to provide a collar or other safety device for pets, having elements or appendages which are highly light-reflective or visible in the dark, and which are so constructed as not to be covered or obscured by the animal's hair.

This object is realized in accordance with the present invention in an animal collar or other device, provided with flexible or extendible relfective elements, strips or body portions, which extend or depend from the body of the collar or other safety device in a direction transverse to the principal length direction of the device. Such flexible reflective elements can be light reflective in their own right, such as those composed of aluminum or other metal foils, or alternatively, the reflective elements can be coated with a reflective paint, such as white or aluminum paint, or a coating which tends to be highly reflective or fluorescent or phosphorescent. It is essential to the invention that the length of the reflective elements be sufficient to extend onto or over the outer surface of the hair or fur of the animal. As an illustration, rectangular plastic strips of approximately one and one-half inches in length, and three-eighths of an inch in width, are suitable for such a protective device for the average cat. The flexibility of such reflective strips, which enables them to ride on the surface of the fur is of utmost importance. Rigid strips or strips of relatively heavy material have been found to have a tendency to sink into, or be covered by the fur of the animal. It has been found, in accordance with the present invention, that the thinner the reflective strips, the more flexible they tend to be. In applications of the invention, the number of strips attached to the collar or other device varies, depending on the degree of reflection desired. The shape of the reflective strips is not critical and can be rectangular, oval, circular, triangular or any similar configuration. Furthermore, the method of affixing the flexible strips to the collar or other device is not critical to the invention. For example, a typical leather collar can have the flexible strips fastened by rivets, adhesive or binding threads, snaps, or the like. Alternately, a collar or safety device in accordance with the present invention can be molded from any type of material, such as a plastic which is highly light-reflective, and has transversely depending or extended portions which are highly flexible.

Further, it is contemplated in accordance with the present invention, that flexible strips of highly light-reflecting material having pressure-sensitive or contact type adhesive, or snaps, on one end only, can be packaged to be sold separately. Such strips are adapted to be secured to an exisiting collar by the purchaser.

The collar or safety device of the present invention is advantageous in that it provides additional protection and visibility without excess weight to encumber or annoy the animal. The collar of this invention facilitates location and safety of the animal particularly at night, by reflecting the headlights of automobiles, flashlights and other similar light sources.

These and other objects, features, and advantages can be better understood from a detailed study of the specification with reference to the attached drawings.

SHORT DESCRIPTION OF THE DRAWINGS

FIG. 1 shows a cat, wearing a collar in accordance with the present invention.

FIG. 2 shows, in side elevation, a safety collar in accordance with the present invention in which the basic collar core, which may be a conventional collar of leather or the like, is threaded through a sleeve formed of light reflecting material, which has depending along its length a plurality of projections.

FIG. 3 is a showing, in side elevation, of a safety collar in accordance with the present invention comprising a core member of leather or the like, having a series of loops depending along its length, which may be sewed or otherwise fastened together near the top to provide a series of shallow loops at the upper end for threading the collar through.

FIG. 4 shows, in side elevation, another form of collar in accordance with the present invention comprising a series of thin flexible strips of light-reflecting material fastened at their upper ends to the core collar, and extended in transverse criss-cross relation along its length.

Figure 6:
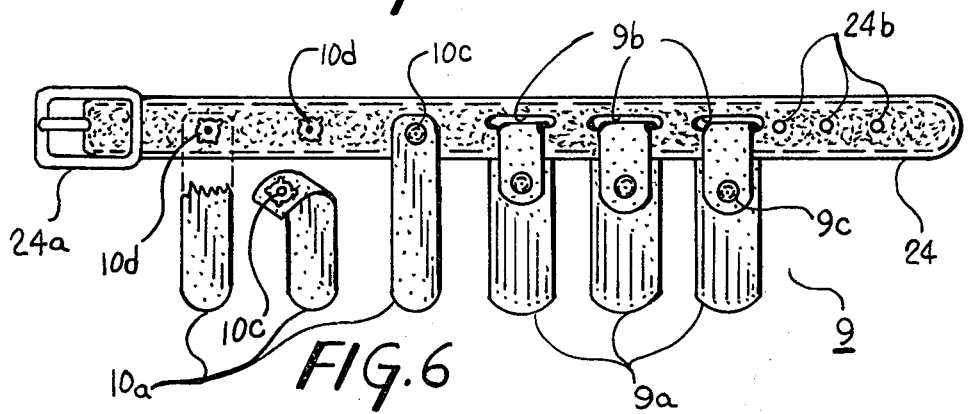

FIG. 6 shows two different ways of applying strips to a collar of the present invention. The three flexible light-reflecting strips at the right-hand end are pulled through lengthwise slits in the collar and snapped to their undersides at the upper ends. The three flexible light-reflecting strips at the left-hand end are snapped directly onto the collar.

Figure 7:
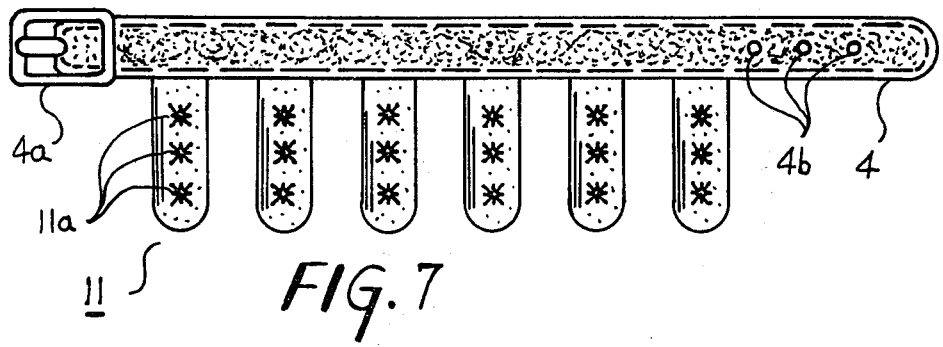

FIG. 7 shows an embodiment in accordance with the present invention in which depending strips of flexible material are fastened along the length of the core collar, each bearing a plurality of light-reflecting studs.

Figure 8:
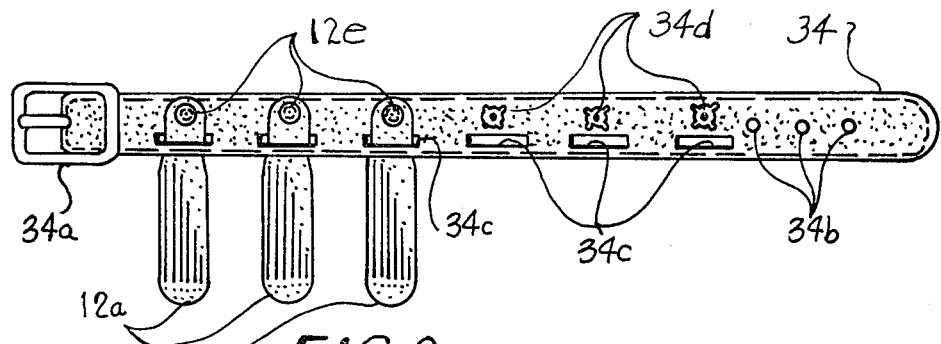

FIG. 8 shows a modification of the invention in which the flexible light-reflecting strips are pulled through corresponding lengthwise slits in the collar and snapped in place near their upper ends to prevent them from shifting in a lateral direction.

Figure 9:
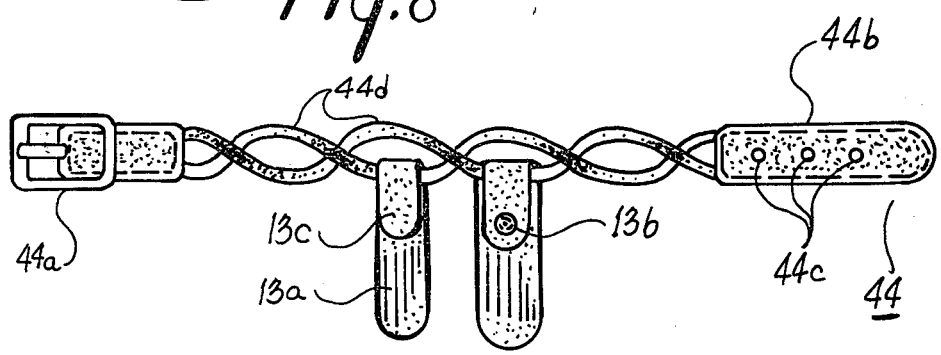

FIG. 9 shows a modification of the invention in which the collar is formed of twisted strands and the depending strips are snapped or secured together around the loops of the twisted strands.

Figure 10:
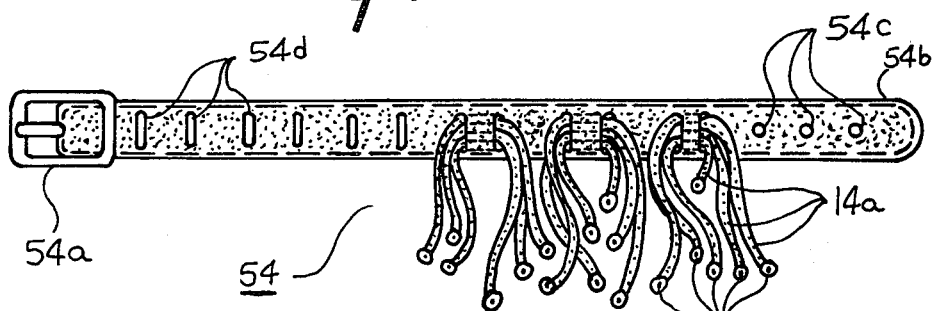

FIG. 10 shows a modification in which the collar has a plurality of parallel slits across its width, and a plurality of flexible strands terminating in light-reflecting buttons is pulled through each pair of slits to depend from the collar.

Figure 11:
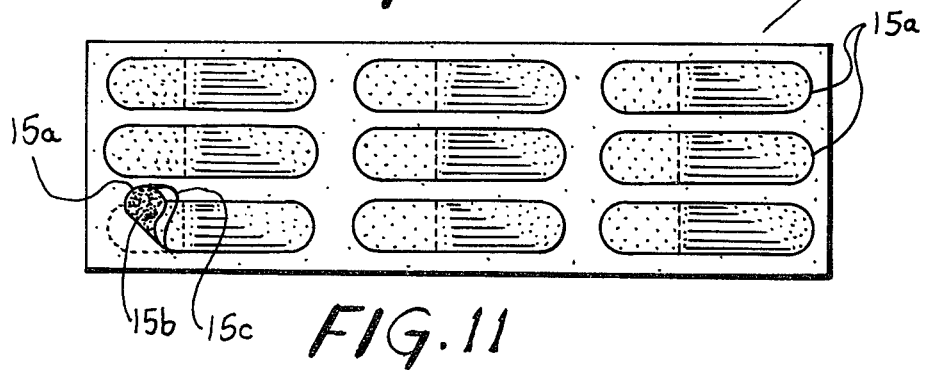

FIG. 11 shows a subcombination in accordance with the present invention in which a plurality of light-reflecting strips having pressure sensitive ends, and protective paper covers are assembled in a kit for modifying a conventional pet collar in accordance with the present invention.

DETAILED DESCRIPTION OF THE DRAWINGS

Referring to FIG. 1 of the present invention, there is shown a cat 1 wearing a typical safety collar 2 constructed in accordance with the present invention, which may be of any of the many and varied forms described hereinafter, which include, depending therefrom, or outwardly extended therefrom, elongated, flexible element 3 which are highly light-reflective. As previously pointed out, the light-reflecting elements of the collar 1 are of such weight, flexibility and construction, that they tend to rest on top of the animal's hair or fur, so as to be highly visible, even though the basic collar may be obscured. Furthermore, the light-reflecting elements 3 are sufficiently light in weight, so that they do not constitute an annoyance to the animal which would tend to cause it to claw or bite them causing their destruction or removal.

It is contemplated, in accordance with the present invention, that the pet safety device here disclosed may take numerous different forms and configurations.

Referring to FIG. 2 there is shown one embodiment of the invention comprising, typically, a basic leather or plastic collar 4, say 12 inches long, and ½ inch wide, which terminates at one end in a conventional buckle or clasp 4a which is constructed with a tongue which engages an appropriate one of the holes 4b at the other end, depending on the size of the animal's neck, and how tight or loose a fit is desired. It will be apparent that other conventional collars and buckles or clasps may also be used for the purpose of the present invention.

In the embodiment under description, the light-reflecting attachment in accordance with the present invention may take the form of a separate member 5, which may comprise, for example, a flat sheet of flexible highly light-reflective material, which is 7 to 8 inches long, and is folded over and sewed with a seam 5c parallel to one of its long edges to form a sleeve 5b constructed to accommodate the collar 4. In the present embodiment, this has depending from the other of its long edges a plurality of parallel strips 5a, each say, 2 to 2½ inches long, ½ to ⅜ inch wide and 1 to 1½ inches apart, extending upward from the lower or outer edge, to within say, one-eighth inch of the lower or outer edge of sleeve. The seam 5c is sewn transversely to the slits across the entire length of 5, parallel to and about, say, 1½ inches below its upper edge. Thus, the basic collar 4 is threaded between the upper edge of 5 and the seam 5c, so that the strips 5a extend outwardly from the outer edge of the collar, in parallel relation along it length. The strips 5a may be rounded at their lower or outer ends to improve their appearance, and increase the comfort of the animal. The attachment 5 may be designed to be formed separately and slipped onto the collar 4, as described, or it may be sewed or secured permanently to the collar, and sold therewith.

A most important feature of the attachment 5 is the material of which it is formed. This may take the form, for example, of a plastic material such as that known as Scotchlite ® Brand reflective transfer film 8730, manufactured and sold by the Safety and Securities Division of the 3M Company of Saint Paul, Minn. Typical reflectivity values are as shown in Table I below.

TABLE I

|  | Observation Angle** | | | | | |
|---|---|---|---|---|---|---|
|  | .2° | | | .5° | | |
| Entrance Angles* | −4 | 20 | 40 | −4 | 20 | 40 |
| 8730 Reflecting Film | 164 | 106 | 52 | 77 | 56 | 30 |

Rainfall will result in a temporary partial loss of reflective performance.

Scotchlite ® Brand reflective transfer film 8730 is a reflective, iron-on film for application to substrates of fabric, vinyl or rubber to enhance night-time visibility. This exposed-lens film appears gray in the daytime, and bright, silver-white when seen under reflected light at night. In one form in which tranfer film 8730 is obtained on the market, it has a removable embossed plastic liner which protects the heat-activated dry adhesive side during shipment and handling. The heat-activated reflective side is protected by a paper liner which adheres to the surface.

An important feature of materials useful for the purpose of the present invention is that they be light in weight so that they do not sink down into the animal's fur but remain on top. For this reason preferred materials for the purposes of this invention will have specific gravities less than one.

For application of the adhesive-backed film, the substrate, which in this case could be a flexible fabric, is cut to the desired shape, and the film, including the plastic and paper liners on its opposite sides, is cut to any desired shape for application to the substrate. A hand iron is preheated to a WOOL setting. The embossed plastic liner is removed; and the film is placed, adhesive side down, on the substrate. The paper lining is allowed to remain; and the heated iron is placed on the paper liner for from 20 to 30 seconds. The iron is then removed; and the film on the substrate is allowed to cool before the paper lining is removed.

If the substrate is a plastic, such as vinyls, polyurethanes or plasticized vinyls, special care should be taken in the application, as the length of heat application and temperature may vary for different materials. If the substrate is rubber, the surface of the substrate should be braided, wiped clean, and a uniform primer coat applied, before the adhesive side of the film is applied to the substrate, after a delay of at least two minutes. The application is then dried in a well-ventilated area for about 24 hours, after which the paper liner is removed. Any air bubbles appearing should be punctured with a pick. As a further alternative, other types of 3M Scotchlite ® reflective fabrics (sold by the roll) or transfer films of 3M Series 8600, 8700 or 8900, or similar material manufactured and sold by other companies, such as a material sold under the trademark "Jog-a-Lite" by the Jog-a-Lite Company of Silver Lake, N.H., can be used for the purposes of the present invention. Another material suitable for the purposes of the present invention is a reflex-reflective sheet material of one of the types disclosed in U.S. Pat. No. 2,567,233, granted to P. V. Palmquist, etal, Sep. 11, 1951. Suitable materials may include numerous different patterns, and colors of high visibility, such as yellow, silver, white, red/orange, fluorescent or lime/yellow fluorescent. Also, within the contemplation of the present invention, certain types of highly reflective metal films or foils or coatings such as aluminum, tin, etc. can be used for the purposes indicated.

Another embodiment of the present invention is shown in FIG. 3 of the drawings. This includes a basic collar 4 of leather, or plastic, substantially similar in construction to the collar disclosed in FIG. 2, fixed to and depending from which are a plurality of parallel loops 6. The latter may be, for example, of any of the light-reflecting types of materials disclosed with reference to the strips 5a of FIG. 2. In the presently described embodiment, the depending loops 6 comprise flexible strands of light-reflecting material each 8 or 9 inches long depending on how its measured and 3/16 to ¼ inch wide, the upper ends being looped over the inner edge of collar 4, and sewed or otherwise fixed to a lengthwise strip 6c, thereby forming inner loops for threading through collar 4 in lengthwise fashion. The U-shaped loops 6 are designed to depend a distance of 2 to 2½ inches below the outer edge of strip 6c, the individual strands being separated, say ½ inch, from each other.

A further modification of the invention shown in FIGS. 2 and 3, is shown in FIG. 4. This includes a plurality of strips 7 which depend transversely from the lower edge of collar 4. A plurality of strips 7a are disposed in parallel relation spaced-apart ¼ to ½inch, along the length of collar 4, forming positive angles of, say, 30 degrees, with the normal to the edge of collar 4. Interposed between the strips 7a are a plurality of oppositely-angled parallel strips 7b, forming negative angles, of, say, 30 degrees, with the normal to the edge of collar 4. In the present embodiment, the strips 7a and 7b are each about 2½ inch to 3 inches long, and ⅜ inch wide, and are secured at their upper ends to or between laminae at the lower edge of the collar 4. Strips 7a and 7b are of such a length that their ends overlap in X fashion, being welded, or sewed, or otherwise secured at the point of intersection, thus forming a web of light-reflecting material which tends to lie on top of the animal's hair. Strips 7a and 7b may be formed of any of the light-reflecting materials described with reference to 5 of FIG. 2.

Figure 5:
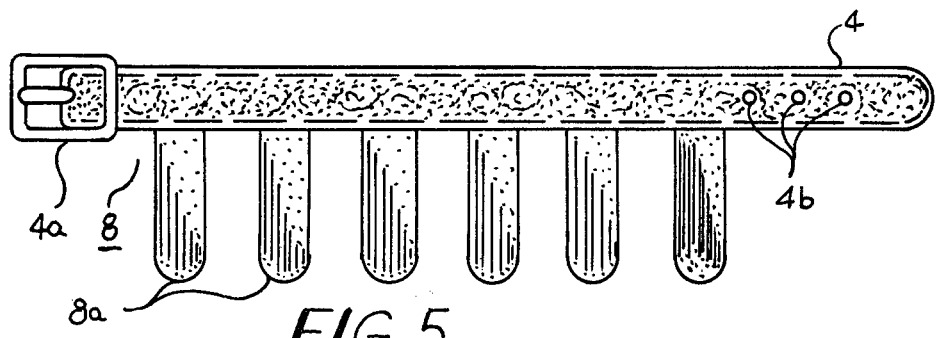
FIG. 5 shows another embodiment of the present invention in which a series of depending elongated strips of flexible, light-reflecting material are sewed or otherwise fastened along the length of the core collar.

Referring to FIG. 5, there is shown a further modification in which a plurality of strips 8, which may be, for example, 2 to 2½ inches long, and ⅜ inch wide, are secured to the outer edge or between the laminae of collar 4, spaced along its length at intervals centered 1 inch apart. The strips 8, which are of similar flexible light-reflecting material to the appendages 5, 6 and 7, described with reference to previous figures, may be rounded at the bottom.

Another modification is shown in FIG. 6, in which a plurality of strips 9, of flexible, highly light-reflecting material similar to that described with reference to the previous figures, are formed and mounted separately on a collar 24, substantially similar to type 4 previously described, except that near the end opposite the buckle, aligned with and commencing just beyond the holes 24b for accommodating the tongue 24a of the buckle, are three linear slots 9b, disposed in end-to-end relation, each ⅜ inch long and spaced-apart 1 inch. Each of the strips 9a, near the end away from the buckle, is, say 3½ inches long, and ⅜ inch wide, and rounded at its lower or outer end. The inner or upper end of the strips 9a, is each threaded through a respective slot 9b and snapped to its lower portion by a respective one of snaps 9c. In accordance with an alternative arrangement shown on the other end, strips 10a, which depend the same distance as strips 9a beyond the outer edge of collar 24, are constructed to snap onto 24 by means of a pair of male and female snaps 10c, 10d, the latter being spaced-apart a distance of, say, 1⅜ inches in central aligned relation along collar 24. Thus, the strips may be removable snapped into place. This would permit a purchaser to select a basic collar, and to select different attachments therefor, depending on the size and type of the animal and the length of its hair.

FIG. 7 shows another modification of the combination in accordance with the present invention, having a plurality of strips 11 depending from and sewn, or otherwise secured, in spaced-apart parallel relation along the lower edge of a basic collar 4, which is substantially similar to that previously described with reference to FIGS. 1–5. The strips 11 may comprise strips, say ⅜ inch wide and 2 to 2½ inches long, comprising a light-reflecting plastic of the type previously described; or alternatively, they may comprise conventional fabric or plastic which is preferably light in weight and flexible, so as to rest on top of the animal's fur without annoying him. In the emodiment of FIG. 7, it is contemplated that the depending strips 11 will be centered about 1 inch apart along the lower edge of collar 4, and are equipped with one or more multifaceted light-reflecting studs 11a, comprising, for example, baguettes of metal, or real or simulated multifaceted crystals, or flecks of reflecting material such as mica. In preferred form, several light-reflecting studs 11a, are applied to each of strips 11.

FIG. 8 shows another modification of the invention, somewhat similar to FIG. 6, in which a collar 34, made of plastic, leather, or the like, having a buckle 34a at one end and a plurality of holes 34b at the other end, for accommodating the buckle. Collar 34 is equipped with a plurality of lengthwise slits, each ¾ inch long, which are spaced-apart in end-to-end aligned relation along the outside edge, with their ends separated, say, 1 inch apart. These are constructed to accommodate a series of depending strips 12a, similar to the strips 10a shown in FIG. 6, each of which has a snap 12e at its upper end which engages one of the snaps 34d along the central long axis of 34. The strips 12a are drawn up through the slits 34c before being snapped into place.

Another modification of the invention is shown in FIG. 9, in which the collar 44 has a buckle 44a at one end and a terminal portion 44b at the other end, which has three centrally aligned holes 44c which are constructed to engage the tongue of buckle 44a. Between 44a and 44b are a pair of twisted strands 44d which form a plurality of loops along the length of the belt. A plurality of depending member 13a, having a pair of male and female snaps 13b near their inner ends, and similar in construction and material to the reflecting strips 9a of FIG. 6, are snapped over adjacent loops along the length of belt 34.

Alternatively, the upper loop of members 12a may be secured by adhesive or other pressure-sensitive seal 13c.

A still further modification is shown in FIG. 10, in which the collar 54 having a buckle 54a and a terminating end 54b with holes 54c to accommodate the tongue of buckle 54a, has a plurality of parallel slots 54d, across its width, which are spaced-apart a distance of, say, ¾ inch along its length. A plurality of strands 14a (say three), about 5 inches long, which may simply be made of yarn, or the like, or alternatively, may be strands of reflecting material of one of the types previously described with reference to FIGS. 2 et seq., is disposed so that each set of strands is pulled through an adjacent pair of slots 54d so that both ends of the strands depend a distance of, say, 2 inches from the outer edge of the collar 54. Each strand has a reflecting baguette, or synthetic multifaceted reflecting crystal 14b or flecks or reflecting material such as mica, secured to its end.

FIG. 11 shows a subcombination of the invention comprising a "kit" 15 in the form of a card, to the surface of which is affixed a plurality of strips 15a of light-reflecting material described with reference to FIGS. 2–6 hereinbefore. The upper end of each of the strips 15a is coated for about 1½ inches along its length with a pressure-sensitive coating 15b, so that it can readily be lifted off of the card and applied to the animal's collar. In accordance with a preferred embodiment, the outside of the light-reflecting tape 15a may be coated with a paper liner 15c, which is removed from the light-reflecting surface when the latter is heat-activated by pressing the liner 15c with a hot iron, as previously described. Alternatively, as previously described with reference to FIG. 6, the inner ends of the strips 15a, instead of being coated with pressure-sensitive material, may be fitted with male and female snaps, so that they can be readily snapped into place along the length of the animal's collar.

Although the invention has been described with reference to a number of different embodiments, many variations of these will occur to those skilled in the art; and the invention is not to be construed as limited to any of the specific forms shown by way of example, but only by the scope of the appended claims.

What is claimed is:

1. A safety device for pets comprising in combination:
   a basic collar comprising one or more straps for securing the device around the neck of an animal;
   one or more flexible members depending from one long edge of said collar in a direction transverse to the principal length direction of said basic collar straps, the distance which said flexible members extend beyond said edge substantially exceeding the width of said basic collar straps, said one or more flexible members being at least partially formed of material having a reflectivity for visible light striking the exposed surface of said material which is characterized by values of candlepower per square foot approximately within a range 52 to 164 for light entering at angles within the range −4° to +40°, as observed at angles within the range 0.2° to 0.5°, wherein said one or more flexible members comprise a plurality of elongated depending strips or strands of material spaced-apart at intervals around at least a portion of said collar.

2. The combination in accordance with claim 1 wherein said flexible members comprise elongated strips which assume any of the shapes selected from the group consisting of oblong, elliptical and triangular.

3. A safety collar for pets in accordance with claim 1 wherein said one or more flexible members comprise a plurality of elongated strips or strands depending from said collar in a direction transverse to the length direction of said collar, adjacent members being in angled relation to one another and bonded together to form a web.

4. The combination in accordance with claim 1 wherein said flexible members comprise elongated depending strips which are each separately secured to said collar at spaced-apart positions along the length of said collar.

5. The combination in accordance with claim 4 wherein said elongated depending strips are secured to said collar by the application of adhesive near the upper ends thereof.

6. The combination in accordance with claim 4 wherein said elongated depending strips are secured to said collar by a series of snaps having one part near the upper end of each of said strips and the corresponding part mounted on the collar.

7. The combination in accordance with claim 4 wherein said elongated depending strips are secured in place along said collar by a series of snaps having one part near the upper end of each of said strips and the corresponding part mounted on the underside of said strips spaced-apart from said one part, to thereby form a loop through which said collar is accommodated.

8. The combination in accordance with claim 4 wherein said collar has a plurality of short slits disposed in end-to-end relation, spaced-apart along its length, and said elongated strips are each passed through a respective one of said slits before being secured to said collar.

9. The combination in accordance with claim 1 wherein said collar is formed of a plurality of twisted strands forming a series of loops along the length thereof, and said elongated strips or strands are looped over and secured in place on one or more of the loops of said collar.

10. The combination in accordance with claim 1 wherein one or more baguettes or light-reflecting studs are applied to each of said elongated depending strips or strands.

11. A safety device for pets comprising in combination:
    A basic collar comprising one or more straps for securing the device around the neck of an animal;
    one or more flexible members depending from one long edge of said collar in a direction transverse to the principal length direction of said basic collar straps, the distance which said flexible members extend beyond said edge substantially exceeding the width of said basic collar straps, said one or more flexible members being at least partially formed of material having a reflectivity for visible light striking the exposed surface of said material which is characterized by values of candlepower per square foot approximately within a range 52 to 164 for light entering at angles within the range −4° to +40°, as observed at angles within the range 0.2° to 0.5°, wherein said one or more flexible members depending from the body of said collar comprise a sleeve which fits over said collar, said sleeve having a skirt portion which depends from one of the long edges of said collar, and which comprises a series of outwardly or downwardly-projecting members spaced-apart along the outer edge of said skirt.

12. A safety device for pets comprising in combination:
    a basic collar comprising one or more straps for securing the device around the neck of an animal;
    one or more flexible members depending from one long edge of said collar in a direction transverse to the principal length direction of said basic collar straps, the distance which said flexible members extend beyond said edge substantially exceeding the width of said basic collar straps, said one or more flexible members being at least partially formed of material having a reflectivity for visible light striking the exposed surface of said material which is characterized by values of candlepower per square foot approximately within a range 52 to 164 for light entering at angles within the range −4° to +40°, as observed at angles within the range 0.2° to 0.5°, wherein said one or more flexible members depending from said collar comprise a plurality of elongated strands at least partially comprising light-reflecting material.

13. The combination in accordance with claim 12 wherein said strands form a plurality of loops along the length of said collar, one end of each of said loops depending outwardly from the lower or outer edge of said collar along one edge thereof, the other ends of said loops together forming a sleeve for accommodating said collar.

14. The combination in accordance with claim 12 wherein said collar comprises a plurality of slits disposed across the width thereof in parallel spaced-apart relation along its length;
   wherein said strands are secured on said collar by threading one or more of said strands through an adjacent pair of slits so that both ends of said strands depend from the lower or outer edge of said collar;
   and wherein a light-reflecting baguette or crystal is applied to one or more of the ends of said strands.

15. A subcombination of a safety device for pets comprising in combination:
   a sleeve member having an elongated opening of a width adapted to be threaded lengthwise onto a basic animal collar comprising one or more straps for securing the collar around the neck of an animal;
   one or more flexible members depending from one long edge of said sleeve in a direction transverse to the principal length direction of said elongated opening, the distance which said flexible members extend beyond said edge substantially exceeding the width of said elongated opening, said one or more flexible members being at least partially formed of material having a reflectivity for visible light striking the exposed surface of said material which is characterized by values of candlepower per square foot approximately within a range 52 to 164 for light entering at angles within the range −4° to +40°, as observed at angles within the range 0.2° to 0.5°, wherein said one or more flexible members comprise a plurality of elongated depending strips or strands or material spaced-apart at intervals along at least a portion of said sleeve.

16. A subcombination of a safety device for pets comprising in combination:
   a sleeve member having an elongated opening of a width adapted to be threaded lengthwise onto a basic collar comprising one or more straps for securing the collar around the neck of an animal;
   one or more flexible members depending from one long edge of said sleeve in a direction transverse to the principal length direction of said elongated opening, the distance which said flexible members extend beyond said edge substantially exceeding the width of said elongated opening, said one or more flexible members being at least partially formed of material having a reflectivity for visible light striking the exposed surface of said material which is characterized by values of candlepower per square foot approximately within a range 52 to 164 for light entering at angles within the range −4° to +40°, as observed at angles within the range 0.2° to 0.5°, wherein said one or more flexible members depending from the body of said sleeve comprise a skirt portion which depends from one of the long edges of said sleeve, and which comprises a series of outwardly or downwardly-projecting members spaced apart along the outer edge of said skirt.

17. A subcombination of a safety device for pets comprising in combination:
   one or more flexible members comprising a plurality of elongated strands each constructed at one end in the form of a loop having an opening of a width adapted to be threaded onto a basic animal collar comprising one or more straps for securing the device around the neck of an animal, said one or more flexible members constructed to depend from one long edge of said collar in a direction transverse to the principal length direction of said basic collar straps, the distance which said flexible members are constructed to extend beyond said edge substantially exceeding the width of said loops, said one or more flexible members being at least partially formed of material having a reflectivity for visiblelight striking the exposed surface of said material which is characterized by values of candlepower per square foot approximately within a range 52 to 164 for light entering at angles within the range −4° to +40°, as observed at angles within the range 0.2° to 0.5°.

* * * * *

UNITED STATES PATENT AND TRADEMARK OFFICE
CERTIFICATE OF CORRECTION

PATENT NO. : 4,407,233
DATED : October 4, 1983
INVENTOR(S) : Eleanor Bozzacco

It is certified that error appears in the above-identified patent and that said Letters Patent are hereby corrected as shown below:

Column 4, after line 6, insert the following paragraphs:

---For the purposes of Table I:

*Entrance Angle is defined as the angle formed by a light beam striking at the same point.

**Observation Angle is defined as the angle between the line formed by a light beam striking a reflective surface and the line formed by its reflected beam.---

Signed and Sealed this

Sixth Day of December 1983

[SEAL]

Attest:

GERALD J. MOSSINGHOFF

Attesting Officer     Commissioner of Patents and Trademarks